(12) United States Patent
Watariuchi

(10) Patent No.: US 10,021,264 B2
(45) Date of Patent: Jul. 10, 2018

(54) INFORMATION PROCESSING APPARATUS AND METHOD FOR EXECUTING AND CONTROLLING SEQUENTIAL PROCESSING

(71) Applicant: CANON KABUSHIKI KAISHA, Tokyo (JP)

(72) Inventor: Satoki Watariuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/946,469

(22) Filed: Nov. 19, 2015

(65) Prior Publication Data
US 2016/0150116 A1 May 26, 2016

(30) Foreign Application Priority Data
Nov. 21, 2014 (JP) .................. 2014-236403

(51) Int. Cl.
G06F 3/12 (2006.01)
H04N 1/00 (2006.01)
G06K 15/02 (2006.01)

(52) U.S. Cl.
CPC ......... H04N 1/00949 (2013.01); G06F 3/123 (2013.01); G06F 3/1204 (2013.01); G06F 3/1275 (2013.01); G06F 3/1286 (2013.01); H04N 1/00204 (2013.01); H04N 2201/0094 (2013.01)

(58) Field of Classification Search
None
See application file for complete search history.

(56) References Cited

U.S. PATENT DOCUMENTS

| 5,537,531 A * | 7/1996 | Suga ...................... G06F 9/445 345/501 |
| 2003/0182446 A1* | 9/2003 | Koide .................. H04L 12/1868 709/238 |
| 2005/0132179 A1* | 6/2005 | Glaum ...................... G06F 8/68 713/1 |
| 2005/0289535 A1* | 12/2005 | Murray ..................... G06F 8/61 717/172 |
| 2006/0044586 A1* | 3/2006 | Kujirai .................. G06F 3/1204 358/1.13 |
| 2007/0244926 A1* | 10/2007 | Vitanov ................ G06F 9/4443 707/621 |
| 2008/0186525 A1* | 8/2008 | Takagi .................. G06F 3/1239 358/1.13 |
| 2008/0244057 A1* | 10/2008 | Kojima ..................... G06F 8/61 709/223 |

(Continued)

FOREIGN PATENT DOCUMENTS

| CN | 101963909 A | 2/2011 |
| CN | 102262505 A | 11/2011 |
| JP | 2007-310468 A | 11/2007 |

*Primary Examiner* — Beniyam Menberu
(74) *Attorney, Agent, or Firm* — Canon U.S.A., Inc. IP Division

(57) ABSTRACT

A flow application receives an event generated by an MFP. If a type of data relating to the event is an expansion program including a definition file, and if an event type is installation, the flow application registers an object associated with the definition file included in the expansion program according to installation of the expansion program.

8 Claims, 19 Drawing Sheets

(56) References Cited

U.S. PATENT DOCUMENTS

| | | | |
|---|---|---|---|
| 2009/0031252 A1* | 1/2009 | Toda | G06F 9/4443 715/826 |
| 2009/0228976 A1* | 9/2009 | Yamaguchi | G06F 21/105 726/16 |
| 2009/0248695 A1* | 10/2009 | Ozzie | H04L 67/2861 |
| 2010/0017797 A1* | 1/2010 | Hwang | G06F 8/61 717/174 |
| 2010/0241873 A1* | 9/2010 | Miyazawa | G06F 21/10 713/191 |
| 2010/0306735 A1* | 12/2010 | Hoff | G06F 8/61 717/109 |
| 2011/0023024 A1* | 1/2011 | Masuda | G06F 3/122 717/176 |
| 2011/0090532 A1* | 4/2011 | Watanabe | G06F 8/61 358/1.15 |
| 2011/0273737 A1* | 11/2011 | Hirao | G06F 21/105 358/1.14 |
| 2011/0292428 A1* | 12/2011 | Ishii | G06F 3/0482 358/1.13 |
| 2012/0033258 A1* | 2/2012 | Fukasawa | H04N 1/00413 358/1.15 |
| 2012/0092729 A1* | 4/2012 | Sakai | G06F 21/105 358/1.16 |
| 2012/0209974 A1* | 8/2012 | Igarashi | H04L 41/022 709/223 |
| 2012/0324376 A1* | 12/2012 | Hong | G06F 9/4443 715/762 |
| 2013/0100475 A1* | 4/2013 | Kuroyanagi | H04N 1/00453 358/1.13 |
| 2014/0025954 A1* | 1/2014 | Isozaki | H04L 63/0227 713/176 |
| 2014/0137261 A1* | 5/2014 | Chen | G06F 21/105 726/26 |
| 2015/0058835 A1* | 2/2015 | Hayami | G06F 8/61 717/170 |
| 2015/0220308 A1* | 8/2015 | Condon | G06F 8/20 717/104 |

* cited by examiner

FIG. 10

551 MANIFEST FILE OF FLOW BUNDLE

1011 — Application-Id: b0010
1012 — Bundle-Name: Scan to Email and Print
1013 — Bundle-Type: FlowData
...

FIG. 11

```
552 FLOW DATA
      1111
<?xml version="1.0" encoding="UTF-8"?>
              1112        1113
<Flow id="f0011" name="SCAN AND THEN SEND & PRINT" icon="542.png">
  <Task type="scan">
    <Item type="color">color</Item>
  </Task>
  <Task type="send">
    <Item type="protocol">E-mail</Item>
    <Item type="destination">foo.bar@canon.com</Item>
  </Task>
  <Task type="print">
    <Item type="color">color</Item>
    <Item type="copies">5</Item>
  </Task>
</Flow>
```

1200 ASSOCIATION INFORMATION

| BUNDLE ID | FLOW ID |
|---|---|
| b0010 | f0011 |

FIG. 15

1500 ASSOCIATION INFORMATION

| BUNDLE ID | FLOW ID |
|---|---|
| b0010 | f0011 |
| b0020 | f0021 |
| b0020 | f0022 |
| b0020 | f0023 |

FIG. 18

1800 ASSOCIATION INFORMATION

| BUNDLE ID | FLOW ID |
|-----------|---------|
| b0010 | f0011 |
| imported | f0031 |

INFORMATION PROCESSING APPARATUS AND METHOD FOR EXECUTING AND CONTROLLING SEQUENTIAL PROCESSING

BACKGROUND OF THE INVENTION

Field of the Invention

The present invention relates to a technique capable of executing and controlling sequential processing (i.e., a workflow) including a plurality of process steps (tasks).

Description of the Related Art

An information processing apparatus (e.g., an image forming apparatus) having the capability of adding an application software as a function expansion program is recently available. Adding a function expansion program (hereinafter, referred to as "expansion program") is feasible not only at the time of factory shipment but also at an operational phase after installation. The added expansion program is similar to a basic program initially installed on the image forming apparatus in that the added expansion program can be displayed on a menu (hereinafter, referred to as "main menu") as a function of the image forming apparatus.

Each expansion program is available with charge or without charge. Further, an expansion program may be usable as a trial version without imposing any charge in a limited period of time. License management is generally performed to prevent any unfair conduct in using an expansion program. A conventionally known license management method includes a product seller issuing a license file that describes license information and requiring a customer to apply the license file in a phase of installing the expansion program.

A multi function peripheral (MFP) is an image forming apparatus that has a scan function, a print function, a FAX transmission/reception function, an electronic mail transmission/reception function, in addition to a basic copy function. When a user intends to use a combination of respective functions, the user is required to perform settings for respective functions. User burden increases correspondingly.

As discussed in Japanese Patent Application Laid-Open No. 2007-310468, it is conventionally proposed to use a flow application capable of defining a workflow that preliminarily defines the execution order of a plurality of tasks corresponding to respective functions (e.g., copy, transmission, and print) of the MFP and processing setting contents of respective tasks.

Further, there is a conventionally proposed system that creates a workflow (hereinafter, referred to as "flow") by using a flow creation application operable on a personal computer (PC), not the flow application, and distributes the created application to a plurality of image forming apparatuses.

The flow application displays a plurality of buttons representing respective flows having been defined, which can be pressed by a user, on an application screen. When a user presses a button, a task defined in the flow can be executed. Each flow defines a sequential operation of a plurality of tasks. Therefore, if each flow is extracted, it looks like a functionally independent application.

There is a demand for the above-mentioned flow that can be provided like an expansion program (like an independent application) to perform license management. However, the flow is data (e.g., XML file) that defines setting values of respective tasks, not an execution format file like an independent application. Therefore, the flow cannot be directly provided as an expansion program. Therefore, it was conventionally difficult to manage each flow like an expansion program based on license.

Further, there is a demand for an additional flow that can be displayed like an expansion program on the main menu so that each user can easily use the flow. However, the flow is data for the flow application. Therefore, even when a flow is newly added, it was conventionally difficult to display the added flow on the main menu, like an expansion program.

SUMMARY OF THE INVENTION

The present invention is directed to a mechanism capable of providing sequential processing (i.e., a workflow) including a plurality of process steps (i.e., tasks) as an expansion program, like an independent application, and capable of registering an object corresponding to the sequential processing on a main menu.

According to an aspect of the present invention, an information processing apparatus configured to execute a processing flow including a plurality of process steps defined according to a definition file, includes a reception unit configured to receive an event generated in the information processing apparatus, a determination unit configured to determine a type of the event if a type of data relating to the received event is an expansion program including a definition file, and a registration unit configured to register an object associated with the definition file included in the expansion program, according to installation of the expansion program, if the event type determined by the determination unit is installation, wherein the object is displayed on a menu configured to accept an instruction to call an application of the information processing apparatus, according to the registration of the object.

Further features of the present invention will become apparent from the following description of exemplary embodiments with reference to the attached drawings.

BRIEF DESCRIPTION OF THE DRAWINGS

FIG. 10 illustrates a manifest file of a flow bundle.

FIG. 11 illustrates an example of flow data.

FIG. 12 illustrates an example of association information according to the first exemplary embodiment.

FIG. 15 illustrates an example of association information according to the second exemplary embodiment.

FIG. 18 illustrates an example of association information according to the third exemplary embodiment.

DESCRIPTION OF THE EMBODIMENTS

Hereinafter, exemplary embodiments of the present invention will be described with reference to attached drawings.

In a first exemplary embodiment, an Open Services Gateway initiative (OSGi) framework is an example of a mechanism capable of adding an expansion program to an image forming apparatus. A Java (registered trademark) program that runs on the OSGi framework is referred to as an OSGi bundle (hereinafter, simply referred to as "bundle"). In the present exemplary embodiment, each expansion program can be realized as an independent bundle. However, application of the present invention is not limited to the mechanism that uses the OSGi framework.

Further, to provide a flow as an expansion program like an independent application, the mechanism according to the present exemplary embodiment configures a bundle of a definition file that defines a flow, which is hereinafter referred to as "flow data". More specifically, the mechanism according to the present exemplary embodiment archives flow data, manifest file, and icon images to be displayed on a main menu (i.e., a menu of basic functions of an image forming apparatus (e.g., functions initially provided for the image forming apparatus)) into a bundle format. Hereinafter, each bundle defined in the above-mentioned manner is referred to as "flow bundle". Ordinarily, each expansion program operates as an application based on an execution file (i.e., Java (registered trademark) class file) included in the bundle. However, it is unnecessary for each flow bundle to include an execution file. The above-mentioned mechanism is a mere example to embody the present exemplary embodiment. The present exemplary embodiment is not limited to the above-mentioned example.

Figure 1:
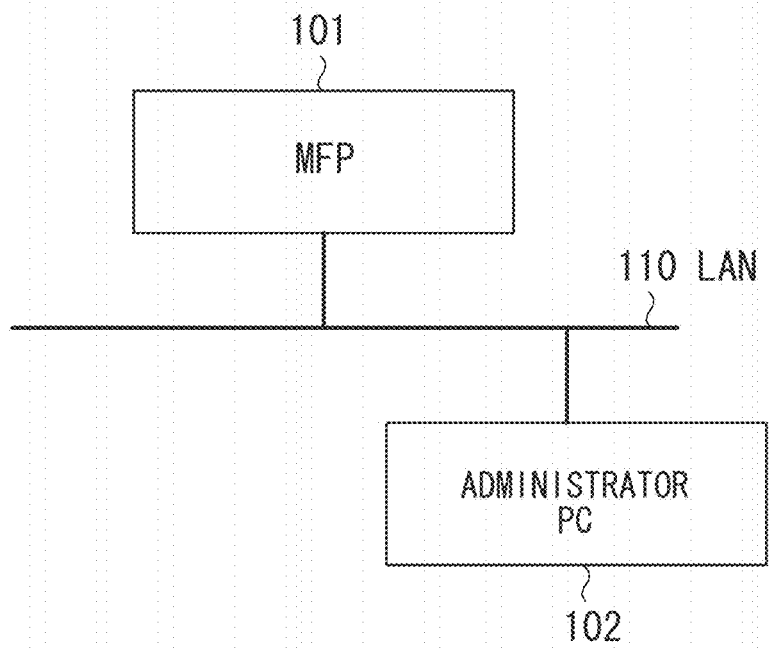
FIG. 1 illustrates a configuration of an image processing system according to an exemplary embodiment of the present invention.

FIG. 1 illustrates a configuration example of an image processing system that includes an information processing apparatus according to an exemplary embodiment of the present invention.

The image processing system illustrated in FIG. 1 includes a multi function peripheral (MFP) 101 and an administrator personal computer (PC) 102 connected with each other via a local area network (LAN) 110.

The MFP 101 is an image forming apparatus (or an image processing apparatus) that is functionally operable as the information processing apparatus according to the present invention. The MFP 101 includes a scanner and a printer. Further, the MFP 101 includes an application platform that can execute the basic program operable on the apparatus and the expansion program managed based on its license. In the MFP 101, there is a flow application operating on the application platform. To perform sequential processing including a plurality of process steps (tasks), such as scan and print steps, the flow application is capable of performing processing (a workflow) according to a definition file (i.e., flow data) defining a plurality of process steps.

The administrator PC 102 is an information processing terminal that can be used by an administrator to manage the MFP 101. The administrator PC 102 can access the MFP 101 via the LAN 110 to add (install) an expansion program to the MFP 101 and to delete (uninstall) the installed expansion program from the MFP 101. A flow creation application is operating on the administrator PC 102.

Figure 2:
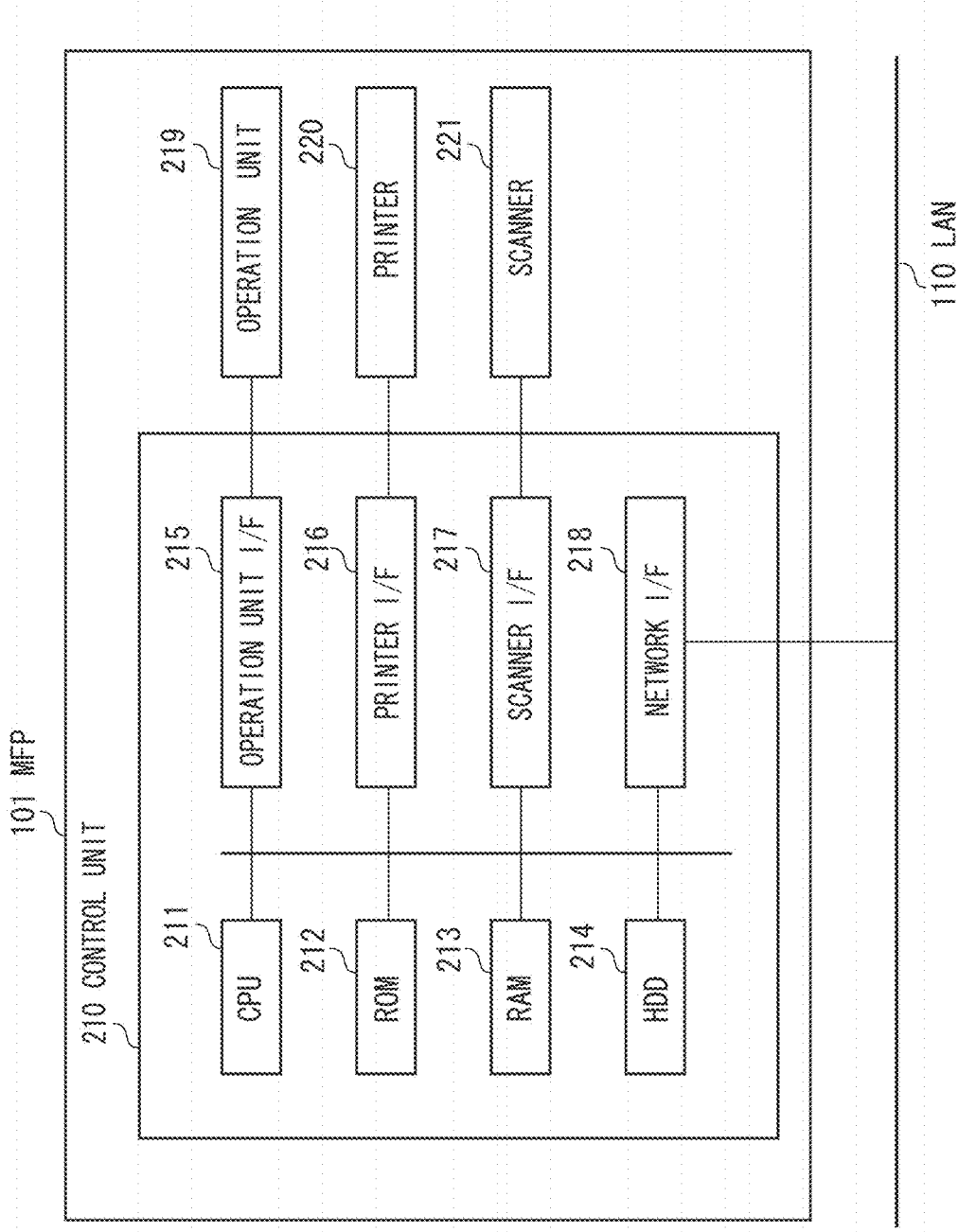
FIG. 2 illustrates a hardware configuration of an MFP.

FIG. 2 is a block diagram illustrating a hardware configuration example of the MFP 101.

In FIG. 2, a control unit 210 includes a central processing unit (CPU) 211. The control unit 210 can control various operations to be performed by the MFP 101. The CPU 211 can perform various control (including reading control and transmission control) processing based on control programs loaded from a read only memory (ROM) 212 or a hard disk drive (HDD) 214. A random access memory (RAM) 213 is usable as a temporary storage area, such as a main memory or a work area, for the CPU 211. The HDD 214 can store image data and various programs including basic programs and each expansion program. The MFP 101 can be configured to include a Solid State Drive (SSD) or any other storage device.

An operation unit I/F 215 connects an operation unit 219 to the control unit 210. The operation unit 219 is equipped with a liquid crystal display unit, which is functionally operable as a touch panel, and a keyboard.

A printer I/F 216 can connect a printer 220 to the control unit 210. Image data to be printed by the printer 220 can be transferred from the control unit 210 to the printer 220 via the printer I/F 216 and can be printed on a recording medium by the printer 220.

A scanner I/F 217 can connect a scanner 221 to the control unit 210. The scanner 221 can generate image data of an image read from a document. The control unit 210 can receive the generated image data from the scanner 221 via the scanner I/F 217.

A network I/F 218 can connect the control unit 210 (i.e., the MFP 101) to the LAN 110. The network I/F 218 can transmit and receive various kinds of information to and from other apparatus accessible via the LAN 110.

Figure 3:
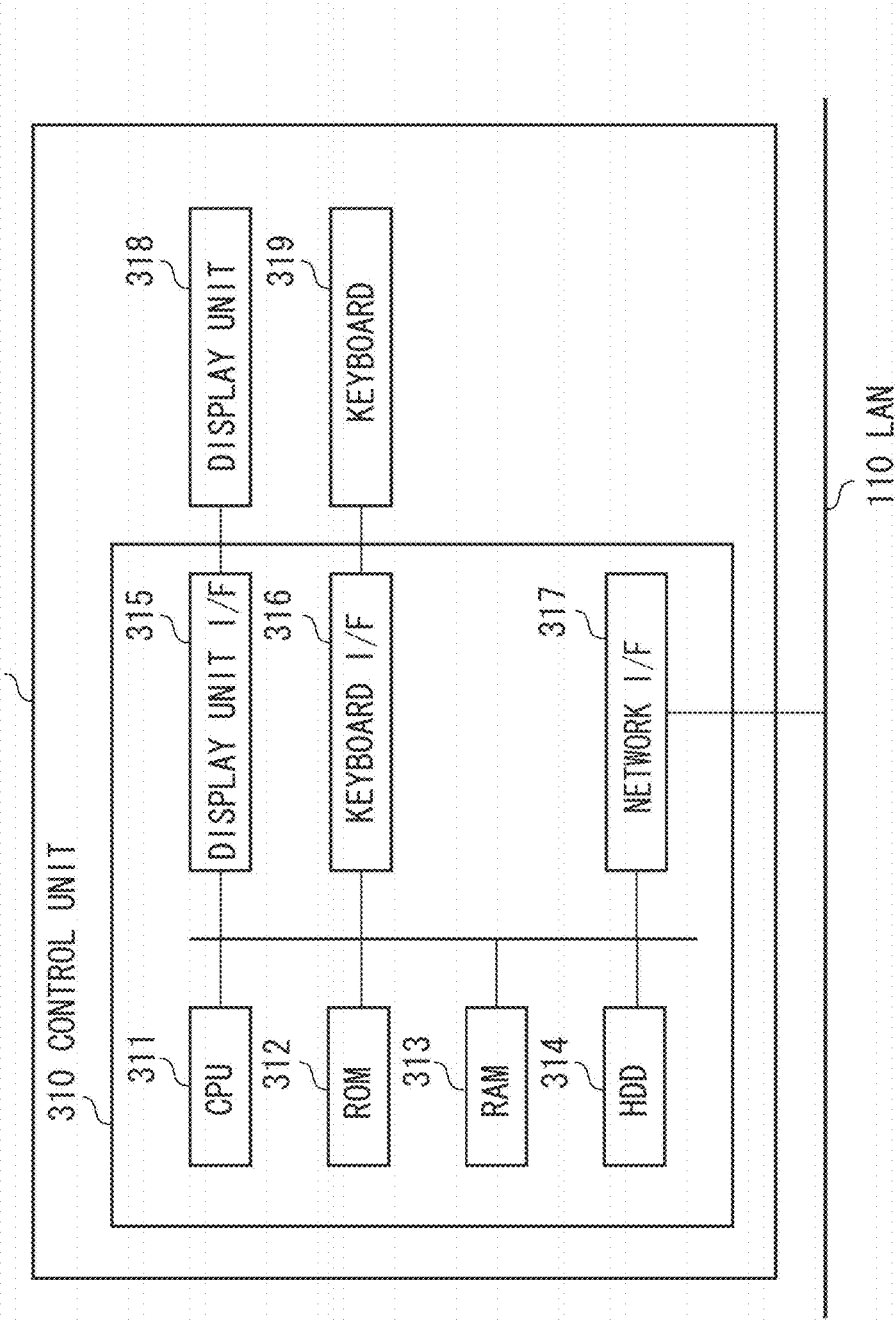
FIG. 3 illustrates a hardware configuration of an administrator PC.

FIG. 3 is a block diagram illustrating a hardware configuration example of the administrator PC 102.

In FIG. 3, a control unit 310 includes a CPU 311. The control unit 310 can control various operations to be performed by the administrator PC 102. The CPU 311 can perform various kinds of control processing based on control programs read from a ROM 312 or a HDD 314. A RAM 313 is usable as a temporary storage area, such as a main memory or a work area, for the CPU 311. The HDD 314 can store various programs. The administrator PC 102 can be configured to include an SSD or any other storage device.

A display unit I/F 315 can connect a display unit 318 to the control unit 310. A keyboard I/F 316 can connect a keyboard 319 to the control unit 310. The CPU 311 can recognize an instruction input via the keyboard 319 from a user and select a screen to be displayed on the display unit 318 according to the recognized instruction.

A network I/F 317 can connect the control unit 310 (i.e., the administrator PC 102) to the LAN 110. The network I/F 317 can transmit and receive various kinds of information to and from other apparatuses accessible via the LAN 110.

Next, addition (installation) and deletion (uninstallation) of an expansion program will be described with reference to FIGS. 4A and 4B. The expansion program illustrated in FIGS. 4A and 4B is a flow bundle.

Figure 4A:
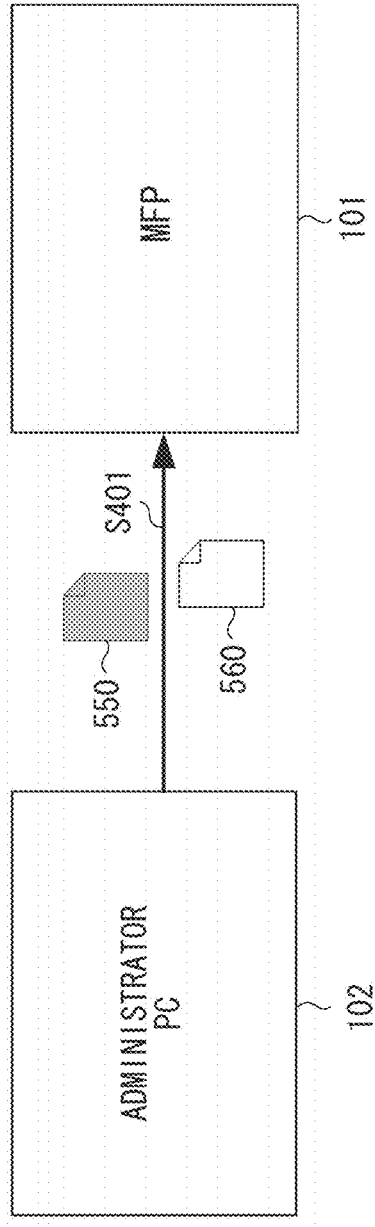
FIG. 4A is a conceptual diagram illustrating installation of an expansion program.
Figure 4B:
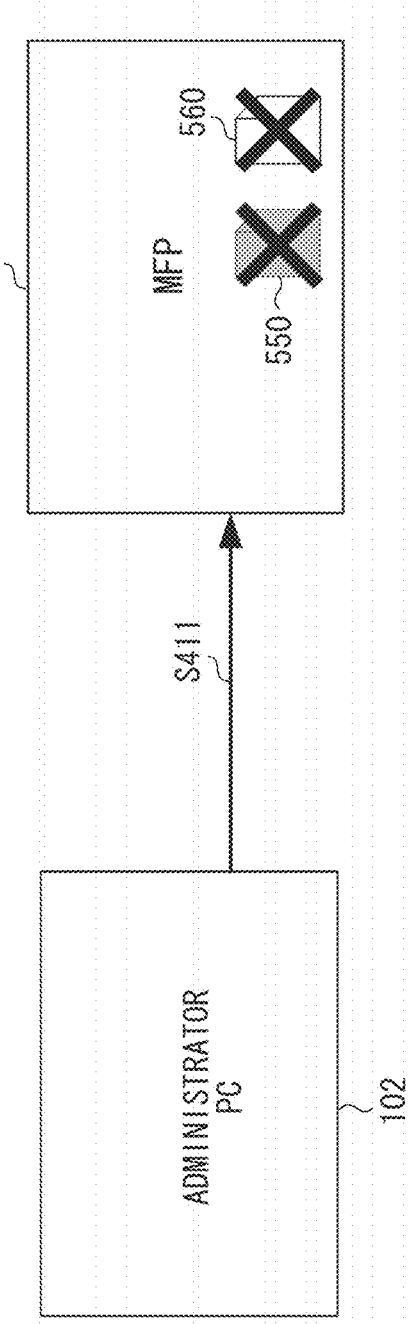
FIG. 4B is a conceptual diagram illustrating uninstallation of an expansion program.

FIGS. 4A and 4B are conceptual views illustrating operations for adding (installing) an expansion program to the MFP 101 and deleting (uninstalling) the expansion program from the MFP 101.

FIG. 4A illustrates an operation to install a flow bundle to the MFP 101, which can be performed by the administrator PC 102.

The administrator PC 102 accesses the MFP 101 via the LAN 110. The administrator PC 102 transmits a flow bundle 550 and a license file 560 illustrated in FIG. 5 together with a flow bundle installation instruction to the MFP 101 (see step S401). The license file 560 is a license file describing license information about the flow bundle 550. For example, expiration date of the license and information identifying an MFP to which the flow bundle 550 can be installed are described in license file 560. The MFP 101 checks the flow bundle 550 and the license file 560 received from the administrator PC 102 and installs the flow bundle 550 if there is not any problem.

FIG. 4B illustrates an operation to uninstall the flow bundle from the MFP 101, which can be performed by the administrator PC 102.

The administrator PC 102 transmits an instruction to the MFP 101 to uninstall the flow bundle 550 (see step S411). The MFP 101 deletes the instructed flow bundle 550 and the related license file 560, as an uninstallation act.

FIG. 10 illustrates an example of detailed description about a manifest file of the flow bundle 550 according to the present exemplary embodiment.

In FIG. 10, Application-Id 1011 is an item that defines ID information uniquely identifying each bundle. Bundle-Name 1012 is an item that defines a name of the bundle. Bundle-Type 1013 is an item that defines a type of the bundle. According to the illustrated example, the bundle is a flow bundle as illustrated in the Bundle-Type 1013.

FIG. 11 illustrates an example of the detailed description about flow definition (hereinafter, referred to as "flow data") according to the present exemplary embodiment.

In FIG. 11, a tag 1110 (Flow tag) defines that the present file is a flow defining file.

An attribute 1111 (id attribute of the Flow tag) defines an identifier uniquely indicating the flow (hereinafter, referred to as "flow ID"). An attribute 1112 (name attribute of the Flow tag) defines a name of the flow. An attribute 1113 (icon attribute of the Flow tag) defines a file name of the icon image displayed on the main menu.

A tag 1120 (Task tag) is a child element of the Flow tag and defines each item relating to the task.

Figure 19A:
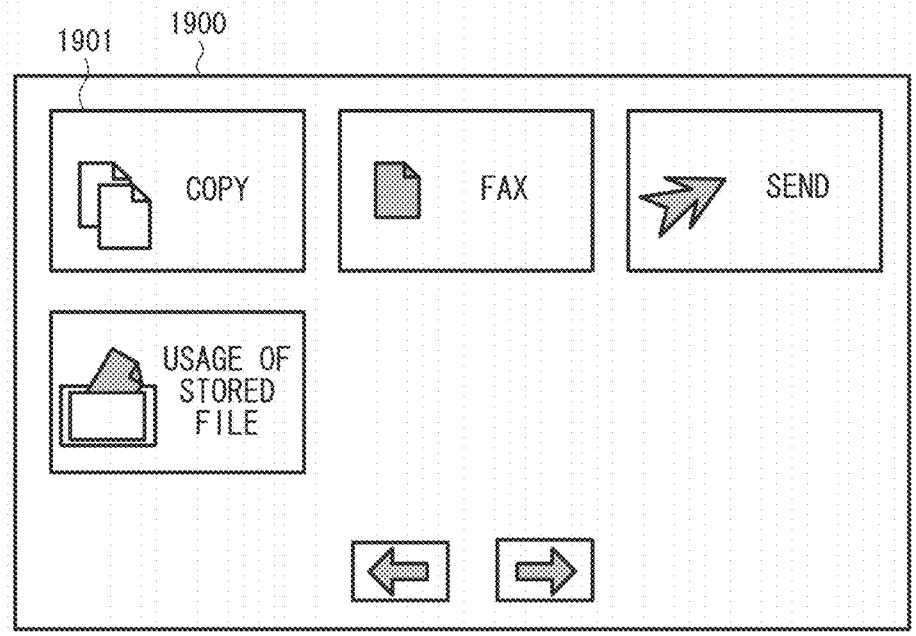
FIGS. 19A and 19B are example displays of a main menu.
Figure 19B:
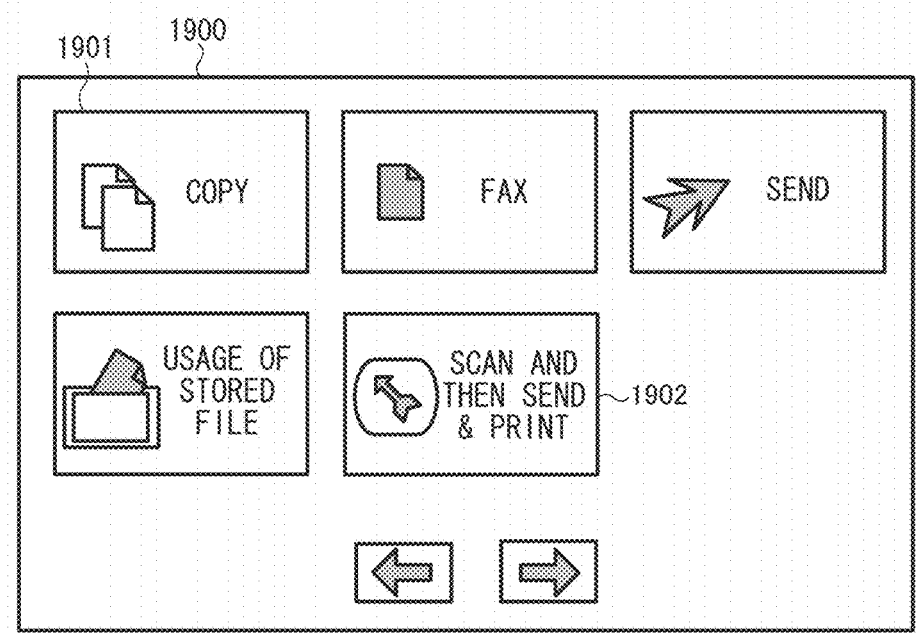

FIGS. 19A and 19B illustrate examples of the main menu that can be displayed on the operation unit 219 of the MFP 101.

FIG. 19A illustrates an example of the main menu at the time of factory shipment.

Various buttons on the main menu illustrated in FIG. 19A indicate objects operable to call the basic programs. If a button 1901 is pressed, the copy function is called (in other words, the screen display is switched to a copy screen).

FIG. 19B illustrates an example of the main menu that can be displayed when a flow bundle (i.e., an expansion program) is installed. The main menu illustrated in FIG. 19B differs from that illustrated in FIG. 19A in that a button 1902 is newly added. The button 1902 is a button newly added when the flow bundle has been installed on the MFP 101. If the button 1902 is pressed, a flow that defines the flow bundle is called.

As apparent from FIG. 19B, there is no substantial discrimination in the display of the button indicating the expansion program (i.e., the flow bundle) in comparison with the displayed buttons of respective basic programs, on the displayed main menu. In the following description, each button operable to call each function via the main menu is referred to as an application button.

The displayed contents of each application button include a button name and an icon image. More specifically, the displayed contents of the button 1902 include a flow name defined by the attribute 1112 and an icon image defined by the attribute 1113. In the present exemplary embodiment, the buttons on the main menu indicate objects operable to call respective basic programs and each function (i.e., each expansion program). However, any other appropriate objects other than the buttons are usable.

Figure 5:
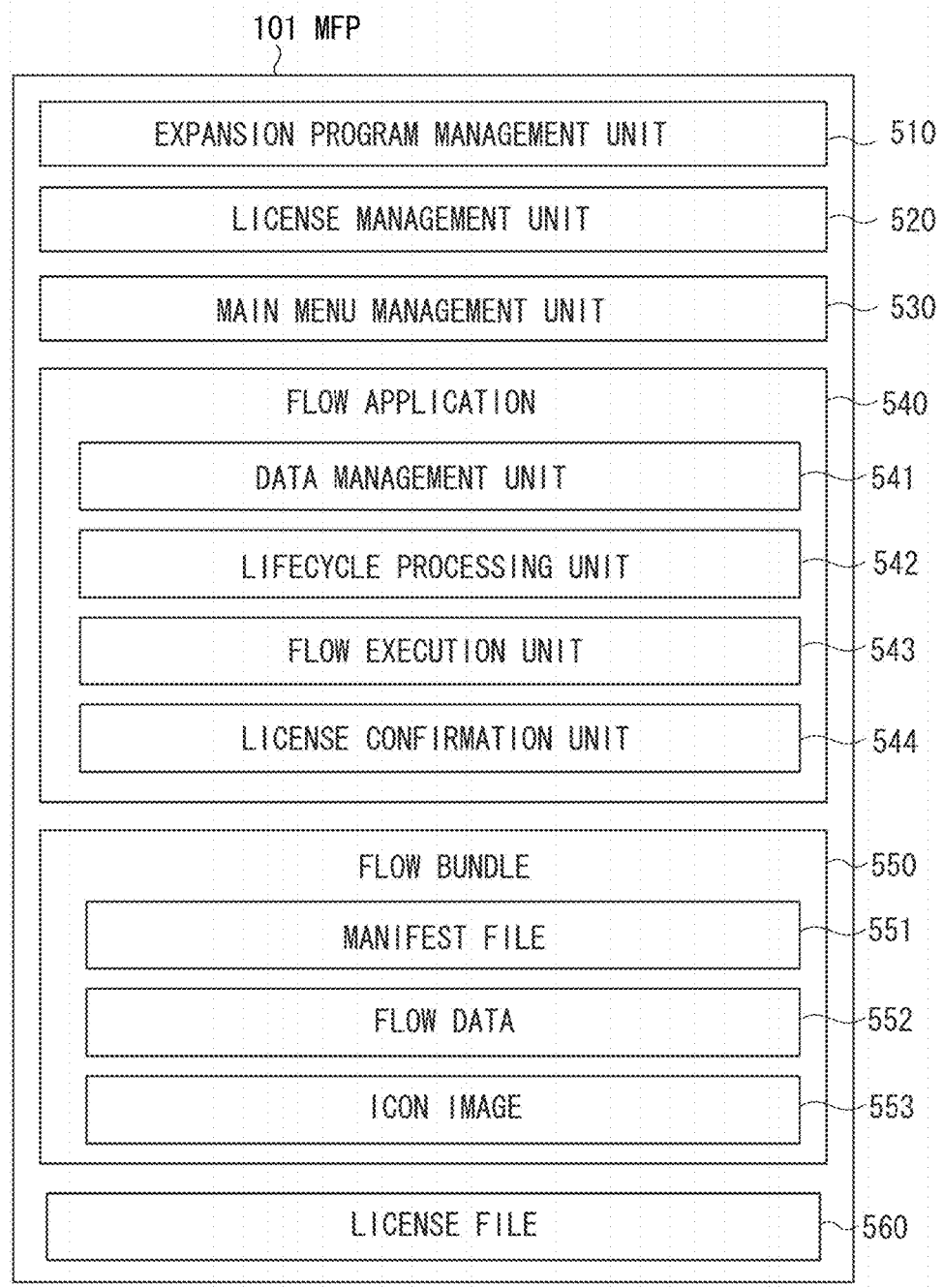
FIG. 5 illustrates a software configuration of the MFP according to a first exemplary embodiment.

FIG. 5 illustrates a software configuration example of the MFP 101 according to the first exemplary embodiment. Each unit illustrated in FIG. 5 is a function unit that can be realized when the CPU 211 reads a program (software) stored in the HDD 214 of the MFP 101 and then analyzes and executes the program loaded in the RAM 213.

In FIG. 5, an expansion program management unit 510 is an application platform for operating each expansion program on the MFP 101. A license management unit 520 can manage license of the expansion program.

The license management unit 520 can confirm the license of each expansion program when it is installed and can confirm the expiration date of the installed expansion program.

A main menu management unit 530 can manage the main menu. For example, the main menu management unit 530 displays application icons on the main menu and calls a program corresponding to the pressed application icon.

A flow application 540 is an application capable of performing processing of the flow. The flow application 540 includes a data management unit 541, a lifecycle processing unit 542, a flow execution unit 543, and a license confirmation unit 544. In the present exemplary embodiment, it is assumed that the flow application 540 is installed beforehand, as a basic program, on the MFP 101 at the time of factory shipment. Alternatively, the system can be configured to allow a user to add the flow application 540 as an expansion program.

The data management unit 541 can manage various data to be processed by the flow application. For example, the data management unit 541 manages information associating the flow data registered in the main menu with the application icons. The lifecycle processing unit 542 can monitor a change (e.g., installation or uninstallation) occurring in the lifecycle of each expansion program and can perform necessary processing according to the change of the lifecycle. The flow execution unit 543 can execute a task defined by the flow data. The license confirmation unit 544 can confirm a license state of the flow bundle.

The flow bundle 550 is a flow bundle having been installed as an expansion program. The flow bundle 550 includes a manifest file 551, a flow data 552, and an icon image 553. The example illustrated in FIG. 5 corresponds to a case where one flow bundle has been installed. The MFP 101 is capable of installing a plurality of flow bundles. When a plurality of flow bundles has been installed on the MFP 101, the same number of installed license files are installed and disposed in the MFP 101.

The manifest file 551 is a manifest file that describes a bundle definition of the flow bundle 550. The flow data 552 is flow data defining each flow that can be provided by the flow bundle 550. The icon image 553 is an icon image to be displayed together with a corresponding application button.

More specifically, the icon image 553 is an icon image that indicates an object on the menu.

The license file 560 is a license file that describes license information about the flow bundle 550.

Figure 6:
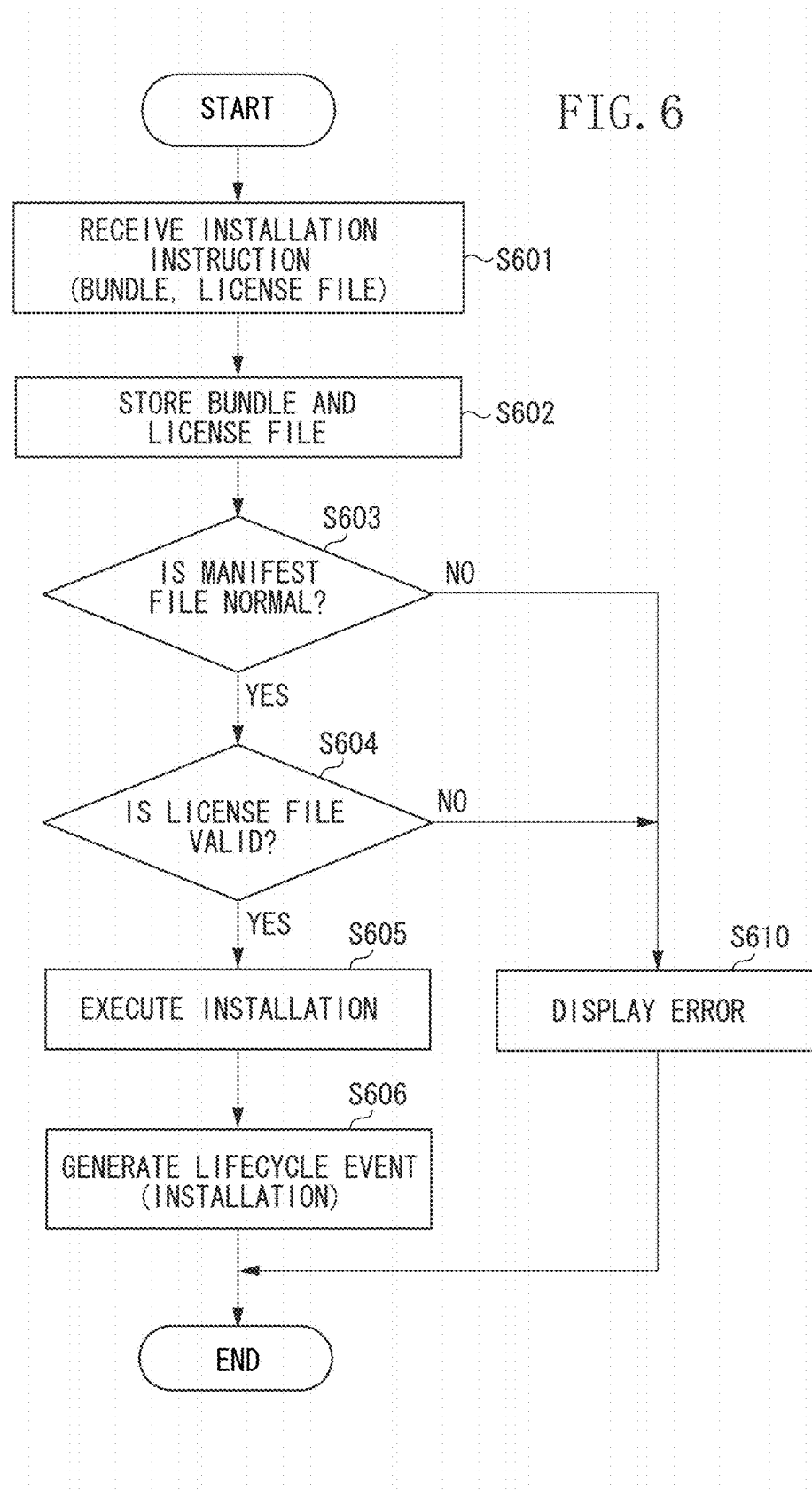
FIG. 6 is a flowchart illustrating processing for installing an expansion program.

FIG. 6 is a flowchart illustrating processing for installing an expansion program on the MFP 101. The processing illustrated in FIG. 6 corresponds to the processing in step S401 illustrated in FIG. 4A, which can be performed by the MFP 101. To realize the processing of the flowchart illustrated in FIG. 6, the CPU 211 reads the program (software) stored in the HDD 214 of the MFP 101 and then analyzes and executes the program loaded in the RAM 213.

First, in step S601, if the expansion program management unit 510 receives an expansion program installation instruction from a user, the operation proceeds to step S602.

In step S602, the expansion program management unit 510 stores a bundle and a license file, which are included in the installation instruction, in the HDD 214.

Next, in step S603, the expansion program management unit 510 determines whether a manifest file stored in the bundle received in the above-mentioned step S601 is normal (i.e., a correct manifest file). For example, the expansion program management unit 510 determines that the manifest file is normal when the manifest file includes a description relating to respective items of Application-Id, Bundle-Name, and Bundle-Type.

Then, if the expansion program management unit 510 determines that the manifest file is not normal (No in step S603), then in step S610, the expansion program management unit 510 displays an error screen and terminates the processing of the flowchart illustrated in FIG. 6.

On the other hand, if the expansion program management unit 510 determines that the manifest file is normal (Yes in step S603), the operation proceeds to step S604.

In step S604, the license management unit 520 confirms whether the license file received in the above-mentioned step S601 is valid. For example, the license management unit 520 determines that the license file is valid if the expiration date of the license described in the license file is within the valid term thereof and the MFP 101 corresponds to information identifying an MFP to which the bundle is installable.

If the license management unit 520 determines that the license file is invalid (No in step S604), then in step S610, the expansion program management unit 510 display the error screen and terminates the processing of the flowchart illustrated in FIG. 6.

On the other hand, if the license management unit 520 determines that the license file is valid (Yes in step S604), the operation proceeds to step S605. In step S605, the expansion program management unit 510 executes the installation of the bundle having been received in the above-mentioned step S601 and locates the bundle in such a way as to validate the bundle on the application platform. Finally, in step S606, the expansion program management unit 510 generates a lifecycle event that notifies of a change having occurred in the lifecycle of the bundle. Then, the expansion program management unit 510 terminates the processing of the flowchart illustrated in FIG. 6. The lifecycle event to be generated in step S606 includes an event type (e.g., installation of the bundle performed in step S605) and information identifying the event generation source bundle.

Figure 7:
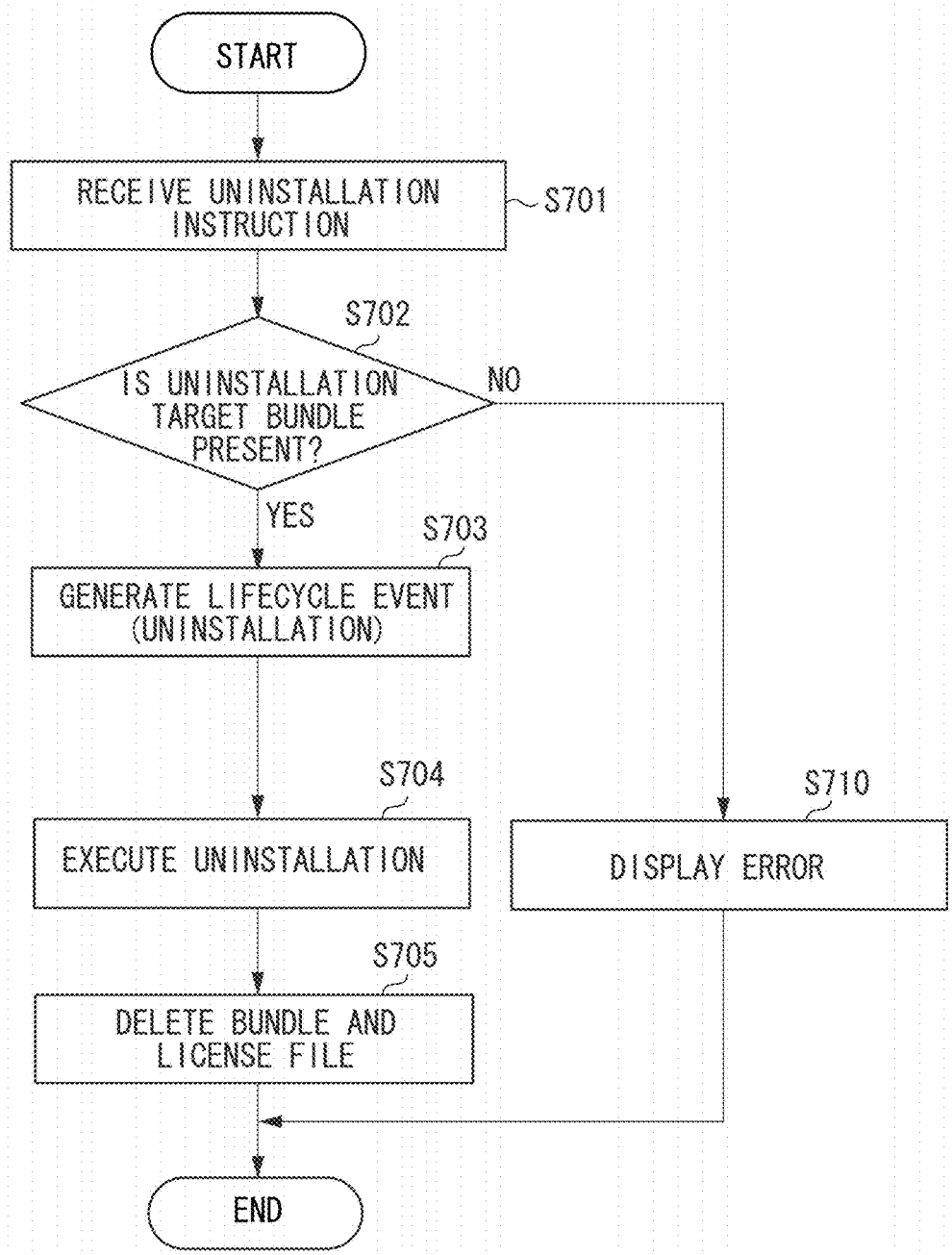
FIG. 7 is a flowchart illustrating processing for uninstalling an expansion program.

FIG. 7 is a flowchart illustrating processing for uninstalling an expansion program from the MFP 101. The processing illustrated in FIG. 7 corresponds to the processing in step S411 illustrated in FIG. 4B, which can be performed by the MFP 101. To realize the processing of the flowchart illustrated in FIG. 7, the CPU 211 reads the program (software) stored in the HDD 214 of the MFP 101 and then analyzes and executes the program loaded in the RAM 213.

First, in step S701, if the expansion program management unit 510 receives an expansion program uninstallation instruction from a user, the operation proceeds to step S702.

In step S702, the expansion program management unit 510 determines whether an uninstallation target bundle is present (i.e., is already installed) on the MFP 101.

Then, if the expansion program management unit 510 determines that the uninstallation target bundle is not present (i.e., is not yet installed) on the MFP 101 (No in step S702), then in step S710, the expansion program management unit 510 displays an error screen and terminates the processing of the flowchart illustrated in FIG. 7.

On the other hand, if the expansion program management unit 510 determines that the uninstallation target bundle is present (i.e., is already installed) on the MFP 101 (Yes in step S702), the operation proceeds to step S703.

In step S703, the expansion program management unit 510 generates a lifecycle event that notifies of uninstallation of the bundle.

Next, in step S704, the expansion program management unit 510 executes the uninstallation of the bundle and invalidates the bundle on the application platform. In step S705, the expansion program management unit 510 deletes the bundle uninstalled in the above-mentioned step S704 together with the related license file from the HDD 214. Finally, the expansion program management unit 510 terminates the processing of the flowchart illustrated in FIG. 7.

Figure 8:
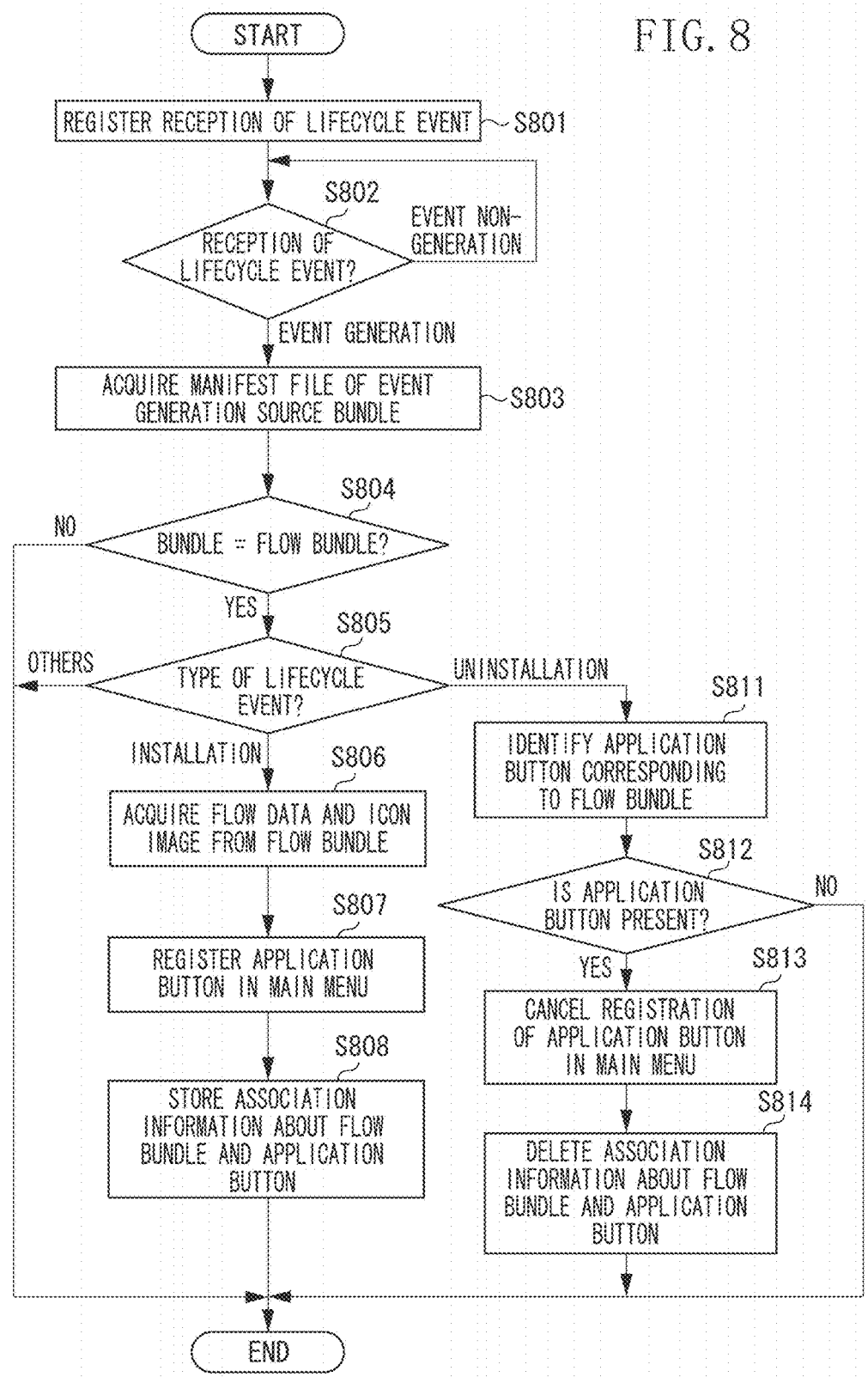
FIG. 8 is a flowchart illustrating lifecycle event processing according to the first exemplary embodiment.

FIG. 8 is a flowchart illustrating processing that can be performed by the flow application 540 to process a lifecycle event according to the first exemplary embodiment. To realize the processing of the flowchart illustrated in FIG. 8, the CPU 211 reads the program (software) stored in the HDD 214 of the MFP 101 and then analyzes and executes the program loaded in the RAM 213.

First, in step S801, the lifecycle processing unit 542 registers reception of a notification of the lifecycle event in the expansion program management unit 510.

Next, in step S802, the lifecycle processing unit 542 waits for generation of the lifecycle event.

Then, if the lifecycle processing unit 542 determines that the lifecycle event has been generated ("event generation" in step S802), the operation proceeds to step S803.

In step S803, the data management unit 541 identifies a lifecycle event generation source bundle and acquires a manifest file corresponding to the identified bundle.

Next, in step S804, the data management unit 541 determines whether the event generation source bundle is a flow bundle based on the bundle type 1013 described in the manifest file acquired in the above-mentioned step S803.

Then, if the data management unit 541 determines that the event generation source bundle is not the flow bundle (No in step S804), the data management unit 541 directly terminates the processing of the flowchart illustrated in FIG. 8. On the other hand, if the data management unit 541 determines that the event generation source bundle is the flow bundle (Yes in step S804), the operation proceeds to step S805.

In step S805, the lifecycle processing unit 542 confirms the type of the lifecycle event.

Then, if the lifecycle processing unit 542 determines that the lifecycle event type is installation of bundle ("installation" in step S805), the operation proceeds to step S806.

In step S806, the data management unit 541 acquires flow data and icon image data from the event generation source flow bundle.

Next, in step S807, the data management unit 541 registers an application button corresponding to the flow in the main menu. When the data management unit 541 registers the application button, the data management unit 541 notifies the main menu management unit 530 of information about four items "application button name", "icon image", "program to be called when the application icon is pressed", and "application button ID uniquely identifying the application button". The data management unit 541 designates the flow name 1112 defined in the flow data as the "application button name" and designates the icon image 553 (the file name 1113 of the icon image) as the "icon image". Further, the data management unit 541 designates the flow application 540 as the "program to be called when the application icon is pressed" and designates the flow ID defined by the flow data 1111 as the "application button ID".

Next, in step S808, the data management unit 541 stores association information about the bundle ID of the event generation source flow bundle and the flow ID (application button ID) registered in the main menu, as illustrated in FIG. 12. Then, the data management unit 541 terminates the processing of the flowchart illustrated in FIG. 8.

FIG. 12 illustrates an example of the association information about the bundle ID and the flow ID of the flow, registered in the main menu, according to the first exemplary embodiment.

Association information 1200 illustrated in FIG. 12 is information associating the bundle ID and the flow ID of the flow registered in the main menu. The association information 1200 is stored in the HDD 214 of the MFP 101. According to the example of the association information 1200 illustrated in FIG. 12, bundle ID "b0010" and flow ID "f0011" are associated with each other.

Referring back to FIG. 8, the description of the flowchart continues as follows.

In the above-mentioned step S805, if the lifecycle processing unit 542 determines that the lifecycle event type is uninstallation of bundle ("uninstallation" in step S805), the operation proceeds to step S811.

In step S811, the data management unit 541 identifies an uninstallation target application button corresponding to the flow bundle (application button ID=flow ID) with reference to the association information 1200.

Next, in step S812, the data management unit 541 determines whether an application button corresponding to the flow bundle is present. Then, if the data management unit 541 determines that the application button corresponding to the flow bundle is present (Yes in step S812), the operation proceeds to step S813.

In step S813, the data management unit 541 notifies the main menu management unit 530 of ID information about the application button to be deleted from the main menu. The main menu management unit 530 cancels the registration of the application button corresponding to the flow bundle.

Further, in step S814, the data management unit 541 deletes the application button the registration of which has been cancelled from the main menu together with association information about the flow bundle. Then, the data management unit 541 terminates the processing of the flowchart illustrated in FIG. 8.

On the other hand, in the above-mentioned step S812, if the data management unit 541 determines that the application button corresponding to the flow bundle is not present (No in step S812), the data management unit 541 terminates the processing of the flowchart illustrated in FIG. 8.

Further, in the above-mentioned step S805, if the lifecycle processing unit 542 determines that the lifecycle event type is neither installation nor uninstallation of a bundle ("others" in step S805), the lifecycle processing unit 542 directly terminates the processing of the flowchart illustrated in FIG. 8.

As apparent from the flowchart illustrated in FIG. 8, the lifecycle processing unit 542 receives an event generated in the MFP 101 and, if the type of the data relating to the received event is an expansion program (i.e., a flow bundle) including a definition file, the lifecycle processing unit 542 determines the type of the event and, if it is determined that the event type is installation, the lifecycle processing unit 542 registers an application icon as an object associated with the definition file included in the expansion program according to the installation of the expansion program. The above-mentioned configuration enables to provide a flow as an expansion program like an independent application and display an application button corresponding to the flow on the main menu.

Figure 9:
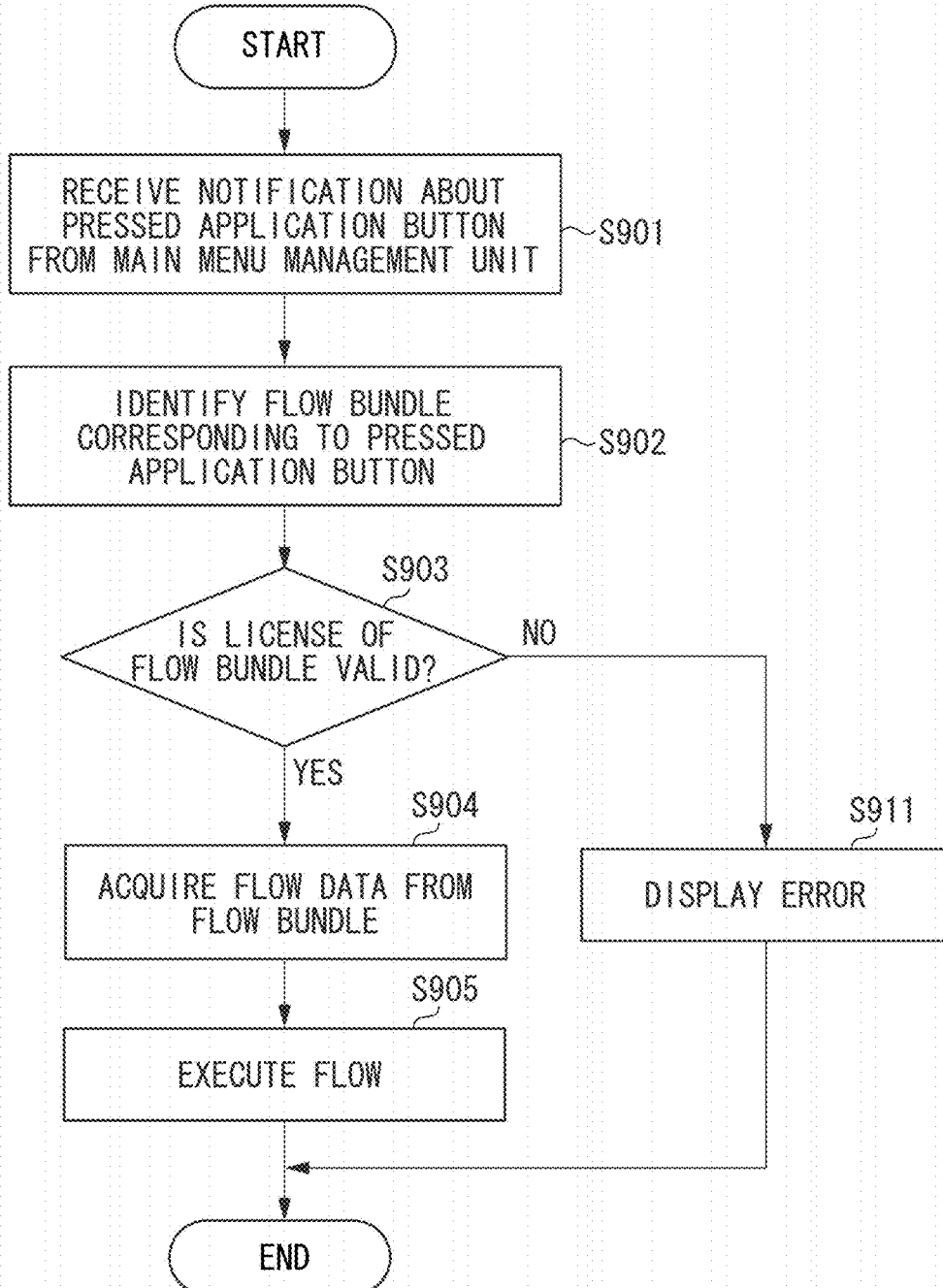
FIG. 9 is a flowchart illustrating processing to be performed when an application button is pressed according to the first exemplary embodiment.

FIG. 9 is a flowchart illustrating processing that can be performed by the flow application 540 when a user presses an application icon of a flow on the main menu, according to the first exemplary embodiment. To realize the processing of the flowchart illustrated in FIG. 9, the CPU 211 reads the program (software) stored in the HDD 214 of the MFP 101 and then analyzes and executes the program loaded in the RAM 213.

First, in step S901, if the data management unit 541 receives a notification informing that the application button has been pressed from the main menu management unit 530, the operation proceeds to step S902. The received notification includes application button ID of the pressed application button.

In step S902, the data management unit 541 identifies a flow bundle corresponding to the pressed application button. In the present exemplary embodiment, the flow ID is designated as the application button ID in step S807 of FIG. 8. Therefore, the application button ID can be directly used as the flow ID. The data management unit 541 identifies the flow bundle by acquiring the bundle ID from the flow ID with reference to the association information 1200.

Next, in step S903, the license confirmation unit 544 inquires of the license management unit 520 if the license of the flow bundle identified in the above-mentioned step S902 is valid and determines a result of the inquiry.

Then, if the license confirmation unit 544 determines that the license is valid (Yes in step S903), the operation proceeds to step S904.

In step S904, the flow execution unit 543 acquires flow data from the flow bundle. Next, in step S905, the flow execution unit 543 executes each task of the flow defined by the acquired flow data and terminates the processing of the flowchart illustrated in FIG. 9.

On the other hand, in the above-mentioned step S903, if the license confirmation unit 544 determines that the license of the flow bundle identified in the above-mentioned step S902 is invalid (No in step S903), then in step S911, the license confirmation unit 544 displays an error screen and terminates the processing of the flowchart illustrated in FIG. 9.

As apparent from the flowchart illustrated in FIG. 9, if the license of an expansion program (i.e., a flow bundle) that includes a definition file associated with a registered object (i.e., an application icon), corresponding to an instruction received via the main menu, is valid, the MFP 101 performs a control in such a way as to perform processing according to the definition file. On the other hand, if the license of the expansion program that includes the definition file associated with the application icon corresponding to the instruction received via the main menu is invalid, the MFP 101 does not perform the processing according to the definition file. The above-mentioned configuration enables to perform the license management of a flow.

As mentioned above, the configuration according to the first exemplary embodiment can provide a flow as an expansion program like an independent application and display an application button corresponding to the flow on the main menu. Further, the configuration according to the first exemplary embodiment can perform the license management.

In the above-mentioned first exemplary embodiment, one flow bundle includes a definition of only one flow. In a second exemplary embodiment, one flow bundle includes a definition of a plurality of flows. More specifically, the flow bundle according to the second exemplary embodiment can include a plurality of flow data and a plurality of icon images. In the present exemplary embodiment, characteristic portions not described in the first exemplary embodiment will be described in detail below.

Figure 13:
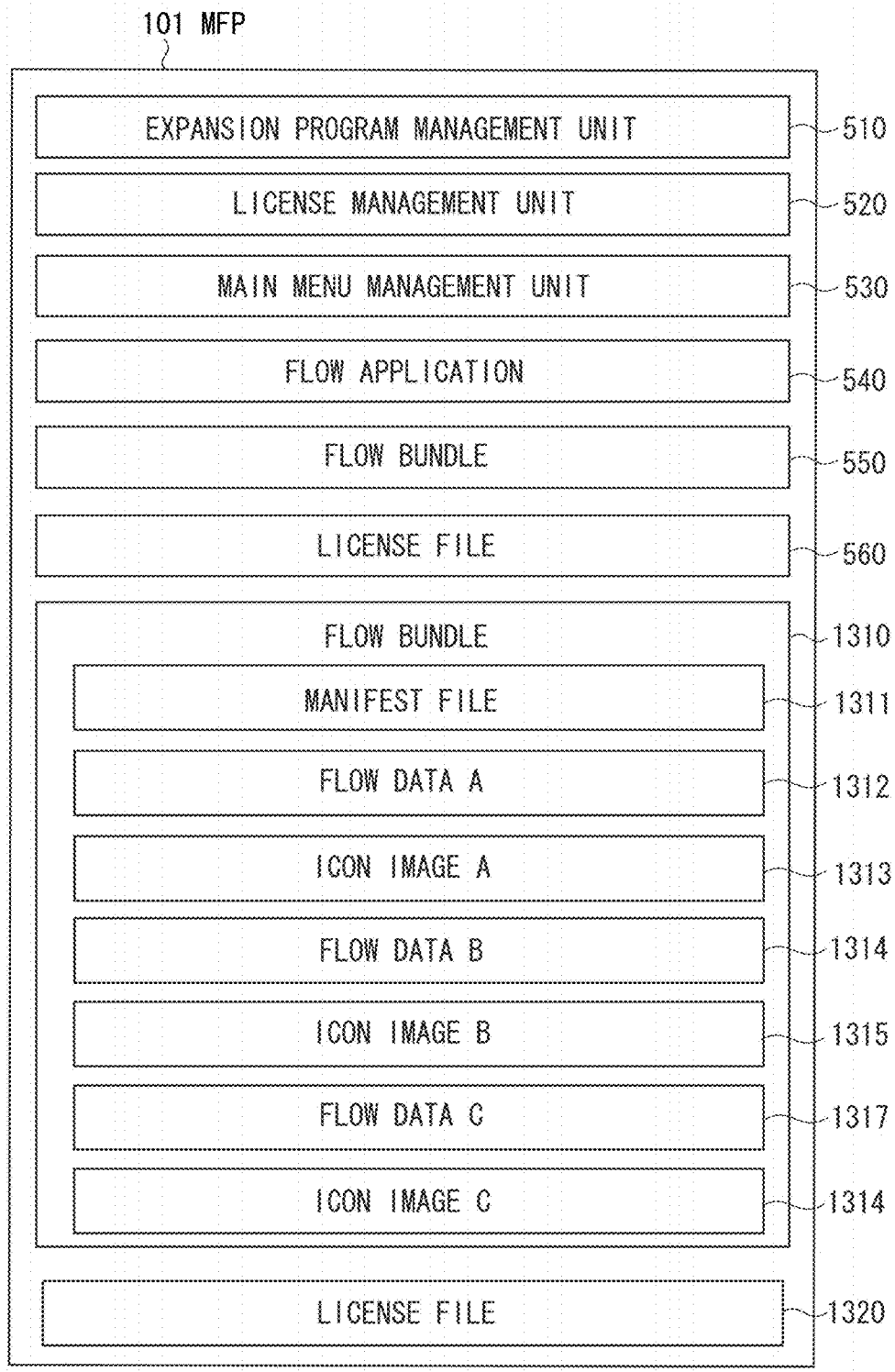
FIG. 13 illustrates a software configuration of an MFP according to a second exemplary embodiment.

FIG. 13 illustrates a software configuration example of the MFP 101 according to the second exemplary embodiment. Each unit (or element) similar to that illustrated in FIG. 5 is denoted by the same reference number. Each unit illustrated in FIG. 13 is a function unit that can be realized when the CPU 211 reads the program (software) stored in the HDD 214 of the MFP 101 and then analyzes and executes the program loaded in the RAM 213.

The software configuration illustrated in FIG. 13 differs from the configuration illustrated in FIG. 5 in that a flow bundle 1310 and a license file 1320 are added. Inside the flow application 540 and the flow bundle 550 are similar to those illustrated in FIG. 5, and therefore, the illustration thereof is omitted in FIG. 13.

In FIG. 13, the flow bundle 1310 is a flow bundle that defines three flows. The flow bundle 1310 includes one manifest file 1311, three flow data 1312, 1314, and 1316, and three icon images 1313, 1315, and 1317. The license file 1320 is a license file for the flow bundle 1310.

Figure 14:
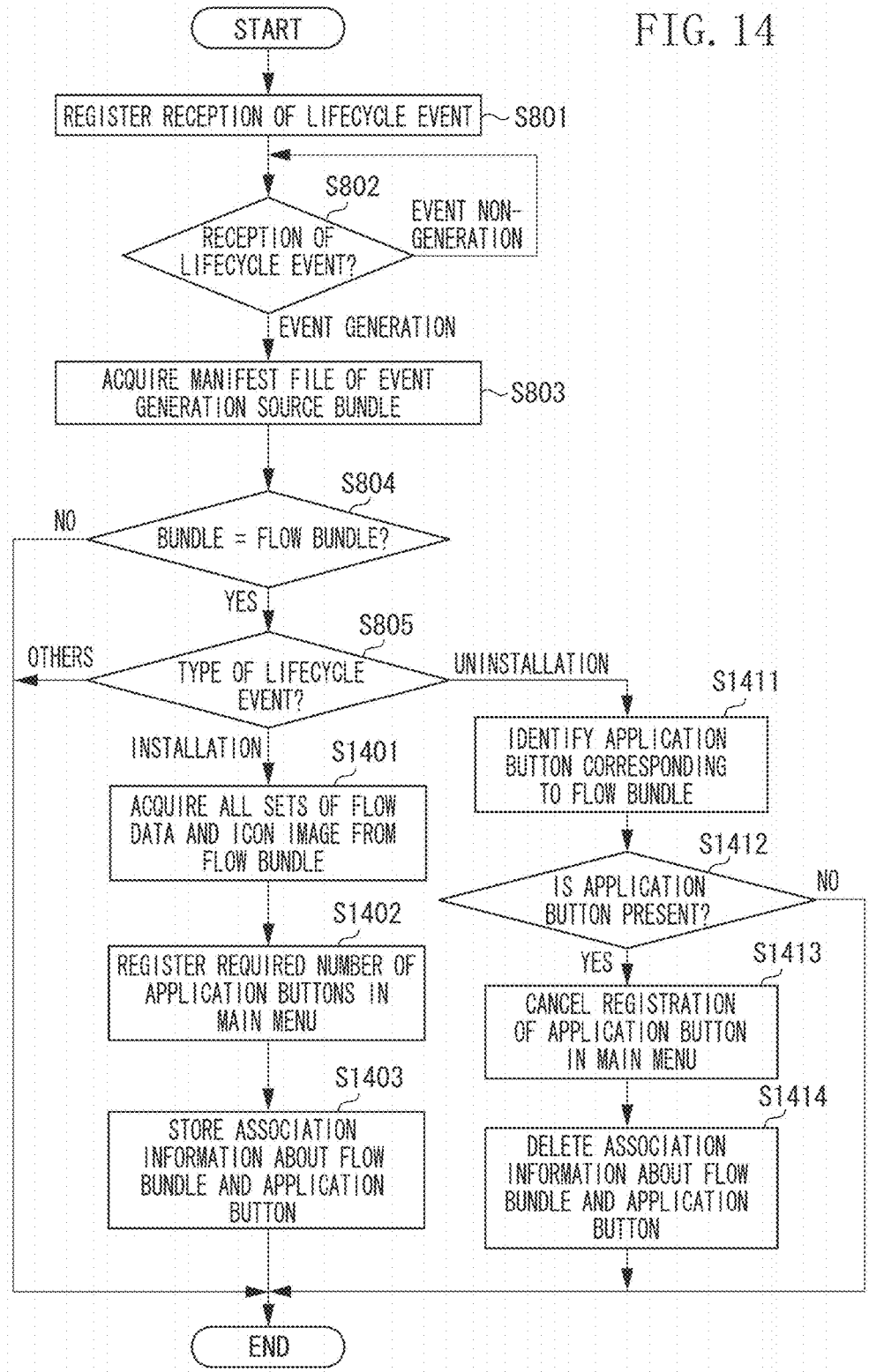
FIG. 14 is a flowchart illustrating lifecycle event processing according to the second exemplary embodiment.

FIG. 14 is a flowchart illustrating processing that can be performed by the flow application 540 to process a lifecycle event according to the second exemplary embodiment. To realize the processing of the flowchart illustrated in FIG. 14, the CPU 211 reads the program (software) stored in the HDD 214 of the MFP 101 and then analyzes and executes the program loaded in the RAM 213. Each step similar to the step illustrated in FIG. 8 is denoted by the same step number and redundant description thereof will be avoided.

In step S805, if the lifecycle processing unit 542 determines that the lifecycle event type is installation of the bundle ("installation" in step S805), the operation proceeds to step S1401.

In step S1401, the data management unit 541 acquires a flow (i.e., a set of flow data and icon image data) from the event generation source flow bundle. If there is a plurality of flows (when the flow bundle includes a plurality of pieces of flow data), the data management unit 541 acquires all of the flows.

Next, in step S1402, the data management unit 541 registers an application button corresponding to each flow (or application buttons corresponding to respective flows) acquired in the above-mentioned step S1401 in the main menu. More specifically, the data management unit 541 registers an application button associated with each flow included in the flow bundle in the main menu.

Next, in step S1403, the data management unit 541 stores association information about the bundle ID of the event generation source flow bundle and the flow ID (i.e., application button ID) registered in the main menu, as illustrated in FIG. 15. Then, the data management unit 541 terminates the processing of the flowchart illustrated in FIG. 14.

Association information 1500 illustrated in FIG. 15 includes information associating the bundle ID and the flow ID of each flow registered in the main menu. The association information 1500 is stored in the HDD 214 of the MFP 101. The information of the association information 1500 illustrated in FIG. 15 includes the bundle ID "b0020" that is associated with three flow IDs "f0021", "f0022", and "f0023", in addition to the association information 1200 (i.e., the associated set of the bundle ID "b0010" and the flow ID "f0011") illustrated in FIG. 12.

Referring back to FIG. 14, the description of the flowchart continues as follows.

In step S805, if the lifecycle processing unit 542 determines that the lifecycle event type is uninstallation of the bundle ("uninstallation" in step S805), the operation proceeds to step S1411.

In step S1411, the data management unit 541 identifies an uninstallation target application button corresponding to the flow bundle (application button ID=flow ID) with reference to the association information 1500. If one flow bundle includes a definition of a plurality of flows, the data management unit 541 identifies a plurality of uninstallation target application buttons.

Next, in step S1412, the data management unit 541 determines whether an application button corresponding to the flow bundle is present. Then, if the data management unit 541 determines that the application button corresponding to the flow bundle is present (Yes in step S1412), the operation proceeds to step S1413.

In step S1413, the data management unit 541 notifies the main menu management unit 530 of the ID information about the application button to be deleted from the main menu. The main menu management unit 530 cancels the registration of the application button corresponding to the flow bundle. If two or more application buttons are identified in the above-mentioned step S1411, the data management unit 541 notifies the main menu management unit 530 of the ID information about all of the identified application buttons. The main menu management unit 530 cancels the registration of all of the identified application buttons.

Further, in step S1414, the data management unit 541 deletes the application button of which registration has been cancelled from the main menu together with the association information about the flow bundle. Then, the data management unit 541 terminates the processing of the flowchart illustrated in FIG. 14.

On the other hand, in the above-mentioned step S1412, if the data management unit 541 determines that the application button corresponding to the flow bundle is not present (No in step S1412), the data management unit 541 terminates the processing of the flowchart illustrated in FIG. 14.

As mentioned above, in installing an expansion program including a plurality of definition files (i.e., a flow bundle including a plurality of flows), the configuration according to the second exemplary embodiment enables the data management unit 541 to register a plurality of objects associated with the plurality of definition files included in the expansion program so that an instruction can be received via the menu. With the above-mentioned configuration, a plurality of flows can be provided as one flow bundle.

According to the above-mentioned first and second exemplary embodiments, the installed flow bundle continuously remains in the MFP 101 unless it is explicitly uninstalled. However, the number of installable expansion programs may be limited in some image forming apparatuses. Therefore, a third exemplary embodiment provides a mechanism capable of automatically uninstalling a flow bundle based on specific conditions and reducing the number of flow bundles that are present in the MFP 101. In the present exemplary embodiment, characteristic portions not described in the first exemplary embodiment will be described in detail below.

Figure 16:
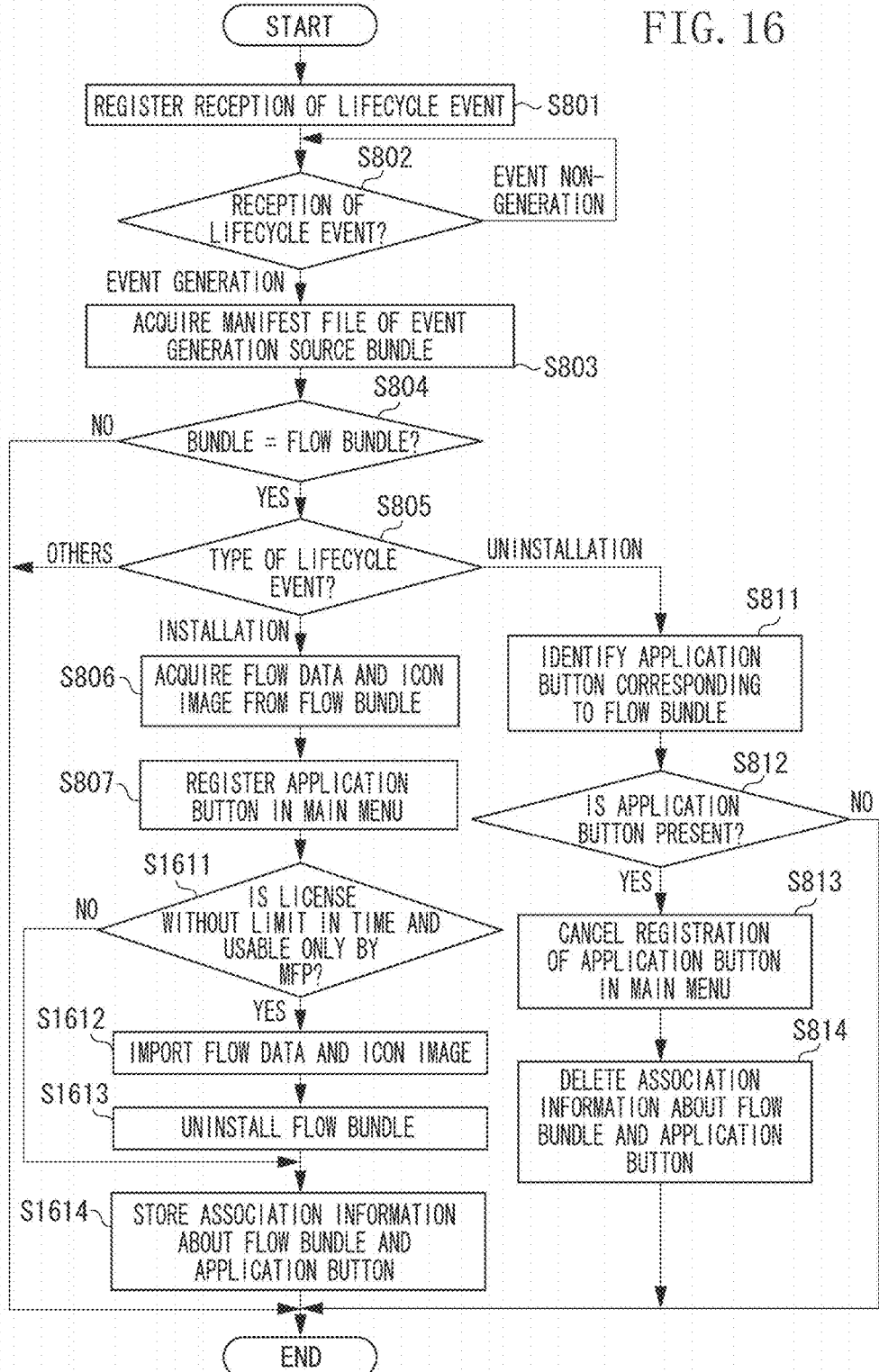
FIG. 16 is a flowchart illustrating lifecycle event processing according to a third exemplary embodiment.

FIG. 16 is a flowchart illustrating processing that can be performed by the flow application 540 to process a lifecycle event according to the third exemplary embodiment. To realize the processing of the flowchart illustrated in FIG. 16, the CPU 211 reads the program (software) stored in the HDD 214 of the MFP 101 and then analyzes and executes the program loaded in the RAM 213. Each step similar to the step illustrated in FIG. 8 is denoted by the same step number and redundant description thereof will be avoided.

If the application button registration processing in step S807 is completed, then in step S1611, the license confirmation unit 544 determines whether the license of the event generation source flow bundle is without limit in time and the license can be used only by the MFP 101 that is currently performing the processing of the flowchart illustrated in FIG. 16.

Then, if the license confirmation unit 544 determines that the license of the event generation source flow bundle is valid for a limited period or the license can be used by an apparatus other than the MFP 101 that is currently executing the processing of the flowchart (No in step S1611), the operation proceeds to step S1614.

On the other hand, if the license confirmation unit 544 determines that the license of the event generation source flow bundle is without limit in time and the license can be used only by the MFP 101 that is currently executing the processing of the flowchart (Yes in step S1611), the operation proceeds to step S1612.

In step S1612, the data management unit 541 extracts flow data and icon image data from the flow bundle and stores the extracted data in a storage region of the HDD 214 managed by the flow application 540.

Next, in step S1613, the data management unit 541 uninstalls the flow bundle. Then, the operation proceeds to step S1614.

In step S1614, the data management unit 541 stores association information about the bundle ID of the event generation source flow bundle and the flow ID (application button ID) registered in the main menu, as illustrated in FIG. 18. Then, the data management unit 541 terminates the processing of the flowchart illustrated in FIG. 16. In this case, if the flow bundle has been uninstalled in step S1613, the bundle ID can be replaced by an ID indicating "already imported". More specifically, the data management unit 541 stores association information about the ID (e.g. "imported") indicating "already imported" and the flow ID (application button ID) registered in the main menu.

FIG. 18 illustrates an example of the association information about the bundle ID and the flow ID of the flow, registered in the main menu, according to the third exemplary embodiment.

Association information 1800 illustrated in FIG. 18 includes information associating the bundle ID and the flow ID of the flow registered in the main menu. The association information 1800 is stored in the HDD 214 of the MFP 101. According to the example of the association information 1800 illustrated in FIG. 18, the bundle ID "imported" indicates that the corresponding bundle is already uninstalled and the flow data is already imported to the flow application.

Figure 17:
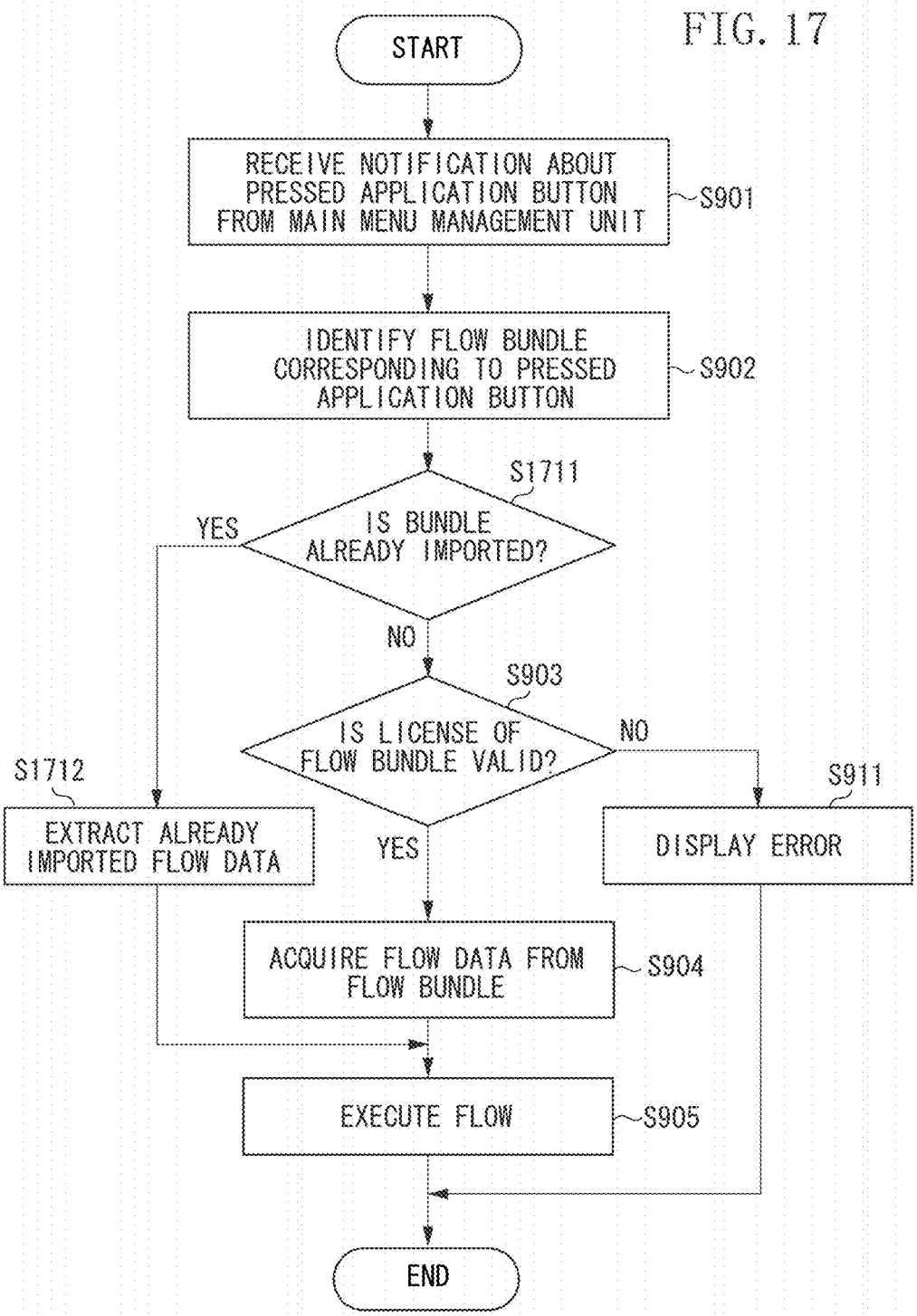
FIG. 17 is a flowchart illustrating processing to be performed when an application button is pressed according to the third exemplary embodiment.

FIG. 17 is a flowchart illustrating processing that can be performed by the flow application 540 when a user presses an application icon of a flow on the main menu, according to the third exemplary embodiment. To realize the processing of the flowchart illustrated in FIG. 17, the CPU 211 reads the program (software) stored in the HDD 214 of the MFP 101 and then analyzes and executes the program loaded in the RAM 213. Each step similar to that illustrated in FIG. 9 is denoted by the same step number and redundant description thereof will be avoided.

If the specific processing for the flow bundle corresponding to the application button is completed in step S902, then in step S1711, the data management unit 541 confirms whether the flow bundle corresponding to the application button pressed on the main menu is "already imported".

Then, if the data management unit 541 determines that the flow bundle corresponding to the application button pressed on the main menu is not "already imported" (No in step S1711), the operation proceeds to step S903. Processing to be performed in step S903 and subsequent steps is similar to that illustrated in FIG. 9 and therefore redundant description thereof will be avoided.

On the other hand, in the above-mentioned step S1711, if the data management unit 541 determines that the flow bundle corresponding to the application button pressed on the main menu is "already imported" (Yes in step S1711), the operation proceeds to step S1712.

In step S1712, the data management unit 541 extracts the already imported flow data, which corresponds to the application button pressed on the main menu. Then, the operation proceeds to step S905. Processing to be performed in step S905 is similar to that illustrated in FIG. 9 and therefore redundant description thereof will be avoided.

As mentioned above, according to the third exemplary embodiment, it is feasible to automatically uninstall a flow bundle based on the specific conditions. As a result, the number of flow bundles that are present in the MFP 101 can be reduced.

In the present exemplary embodiment, the specific conditions include a condition that the license of the event generation source flow bundle is without limit in time and a condition that the license can be used only by the MFP 101 that is currently executing the processing of the flowchart illustrated in FIG. 16. However, the specific conditions are not limited to the above-mentioned examples and can be another appropriate condition. For example, the specific conditions may include at least one of the condition that the license of the event generation source flow bundle is without limit in time and the condition that the license can be used only by the MFP 101 that is currently executing the processing of the flowchart illustrated in FIG. 16. Further, the specific conditions may include a condition that the valid term of the license is equal to or longer than a specific period (e.g., 10 years) or may include any other appropriate condition.

In the above-mentioned exemplary embodiments, the MFP is a mere example of the information processing apparatus according to the present invention. The apparatus to which the present invention can be applied is not limited to the MFP. The present invention is applicable to any other information processing apparatus. For example, the present invention is applicable to any other apparatus to which an expansion program managed based on an authorized license can be added and can execute a workflow including a combination of a plurality of executable tasks. For example, the present invention is applicable to consumer electrical appliances (e.g., televisions) and car navigation systems.

As mentioned above, in the exemplary embodiments of the present invention, if a flow bundle defining flow data and icon image data is installed on the MFP 101, the flow application 540 of the MFP 101 registers an application icon corresponding to the flow bundle in the main menu. If a user points the application icon, the flow application 540 confirms the license of the pointed application and acquires flow data from the flow bundle associated with the application icon. Then, the flow application 540 executes each task of a workflow defined by the flow data. With the configuration according to the above-mentioned exemplary embodiments, a workflow can be provided as an expansion program like an independent application and display an application button corresponding to the workflow on the main menu. Further, with the configurations according to the above-mentioned exemplary embodiments, the license management can be performed. Accordingly, the configurations according to the exemplary embodiments can construct a framework for managing each workflow based on a license thereof and realize license management in practice.

The configurations and contents of various data are not limited to the above-mentioned examples. Their configurations and contents can be modified in various ways considering applications and purposes.

Although some exemplary embodiments of the present invention have been described, the present invention can be embodied as a system, an apparatus, a method, a program, or a storage medium. More specifically, the present invention can be applied to a system composed of a plurality of devices or can be applied to an apparatus constituted by a single device.

Further, the present invention encompasses any configuration obtainable by combining the above-mentioned exemplary embodiments.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-236403, filed Nov. 21, 2014, which is hereby incorporated by reference herein in its entirety.

What is claimed is:

1. An information processing apparatus including a platform on which an application configured to control an execution of a processing flow including a plurality of process steps defined according to a definition file is operated, the apparatus comprising:

a memory storing instructions; and a processor which is capable of executing the instructions causing the information processing apparatus to:

manage definition files included in an expansion program as a bundle for locating each definition of a plurality of process steps on the platform, if a manifest file included in the expansion program satisfies a specific condition and a license corresponding to the expansion program is valid, wherein the bundle includes the definition files, the manifest file describing a type of data, and objects associated with each definition file;

determine, if a type of data relating to an event generated in the information processing apparatus is an expansion program for locating at least one definition of a plurality of process steps on the platform, a type of the event; and register, according to installation of the expansion program including the managed definition files, all of the objects associated with the each definition file included in the expansion program, if it is determined that the event type is installation, wherein the objects are displayed on a menu configured to accept an instruction to call each program installed in the information processing apparatus, according to the registration of the objects, wherein the application different from the expansion program performs control in such a way as to execute processing corresponding to the defined process steps by using the definition file associated with one of the objects selected via the menu.

2. The information processing apparatus according to claim 1, wherein the instructions further cause the information processing apparatus to:

cancel registration of all of the objects included in the expansion program, according to deletion of the expansion program, and cancel the registration of all of the objects on the menu, if it is determined that the event type is uninstallation of the expansion program as the bundle.

3. The information processing apparatus according to claim 1, wherein the application performs control in such a way as to execute processing corresponding to the defined plurality of process steps, if the license corresponding to the expansion program that includes the definition file associated with the object selected via the menu is valid, wherein the application does not execute the processing according to the definition file, if the license of the expansion program that includes the definition file associated with the object selected via the menu is invalid.

4. The information processing apparatus according to claim 1, wherein the instructions further cause the information processing apparatus to:

delete the expansion program and the license file if the expansion program including the managed definition files is uninstalled.

5. The information processing apparatus according to claim 4, wherein the specific condition includes at least one of a condition that a valid term of the license for the expansion program is without limit in time and a condition that the expansion program is usable by the information processing apparatus only.

6. The information processing apparatus according to claim 1, wherein the information processing apparatus is an image forming apparatus.

7. A method for an information processing apparatus including a platform on which an application that controls an execution of a processing flow including a plurality of process steps defined according to a definition file is operated, the method comprising:

managing definition files included in an expansion program as a bundle for locating each definition of a plurality of process steps on the platform, if a manifest file included in the expansion program satisfies a specific condition and a license corresponding to the expansion program is valid, wherein the bundle includes the definition files, the manifest file describing a type of data, and objects associated with each definition file;

determining, if a type of data relating to an event generated in the information processing apparatus is an expansion program for locating at least one definition of a plurality of process steps on the platform, a type of the event; and registering, according to installation of the expansion program including the managed definition files, all of the objects associated with the each definition file included in the expansion program, if it is determined that the event type is installation, wherein the objects are displayed on a menu configured to accept an instruction to call each program installed in the information processing apparatus, according to registration of the objects, wherein the application different from the expansion program performs control in such a way as to execute processing corresponding to the defined process steps by using the definition file associated with one of the objects selected via the menu.

8. A non-transitory computer readable storage medium on which is stored a computer program for making a computer execute a method for an information processing apparatus including a platform on which an application that controls an execution of a processing flow including a plurality of process steps defined according to a definition file is operated, the method comprising:

managing definition files included in an expansion program as a bundle for locating each definition of a plurality of process steps on the platform, if a manifest file included in the expansion program satisfies a specific condition and a license corresponding to the expansion program is valid, wherein the bundle includes the definition files, the manifest file describing a type of data, and objects associated with each definition file;

determining, if a type of data relating to an event generated in the information processing apparatus is an expansion program for locating at least one definition of a plurality of process steps on the platform, a type of the event; and registering, according to installation of the expansion program including the managed definition files, all of the objects associated with the each definition file included in the expansion program, if it is determined that the event type is installation, wherein the objects are displayed on a menu configured to accept an instruction to call each program installed in the information processing apparatus, according to registration of the objects, wherein the application different from the expansion program performs control in such a way as to execute processing corresponding to the defined process steps by using the definition file associated with one of the objects selected via the menu.

* * * * *